(12) United States Patent
Cohen et al.

(10) Patent No.: US 12,099,616 B2
(45) Date of Patent: Sep. 24, 2024

(54) PHYSICALLY UNCLONABLE FUNCTION BASED ON A PHASE CHANGE MATERIAL ARRAY

(71) Applicant: International Business Machines Corporation, Armonk, NY (US)

(72) Inventors: Guy M. Cohen, Westchester, NY (US); Nanbo Gong, White Plains, NY (US); Takashi Ando, Eastchester, NY (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 17/454,832

(22) Filed: Nov. 15, 2021

(65) Prior Publication Data

US 2023/0153444 A1 May 18, 2023

(51) Int. Cl.
*G06F 21/72* (2013.01)
*G06F 21/60* (2013.01)
*G06F 21/73* (2013.01)
*G11C 11/56* (2006.01)
*H04L 9/32* (2006.01)

(52) U.S. Cl.
CPC ............ *G06F 21/602* (2013.01); *G06F 21/72* (2013.01); *G06F 21/73* (2013.01); *G11C 11/5642* (2013.01); *G11C 11/5678* (2013.01); *H04L 9/3278* (2013.01)

(58) Field of Classification Search
CPC ......... G06F 21/72; G06F 21/73; H04L 9/3278
See application file for complete search history.

(56) References Cited

U.S. PATENT DOCUMENTS

| 7,103,183 | B2 | 9/2006 | Okabe |
| 8,334,757 | B2 | 12/2012 | Guajardo Merchan |

(Continued)

FOREIGN PATENT DOCUMENTS

| CN | 109495272 A | 3/2019 |
| CN | 109509495 A | 3/2019 |
| CN | 109495272 B | 4/2021 |

OTHER PUBLICATIONS

Doevenspeck et al., "Temporal Sequence Learning With A History-Sensitive Probabilistic Learning Rule Intrinsic to Oxygen Vacancy-Based RRAM," 2018 IEEE International Electron Devices Meeting (IEDM), 2018, 1 Pg., doi: 10.1109/IEDM.2018.8614489.

(Continued)

*Primary Examiner* — Daniel B Potratz
(74) *Attorney, Agent, or Firm* — Edward J. Wixted, III

(57) ABSTRACT

In an approach to a implementing a PUF based on a PCM array, for each PCM device in an array of PCM devices, the PCM device is reset to an initial state. A first conductance of the PCM device is measured. A predetermined number of partial set pulses is applied to the PCM device. A second conductance of the PCM device is measured. Responsive to determining that the second conductance is greater than the first conductance multiplied by a factor, a PUF value of the PCM device is set to logical "1". Responsive to determining that the second conductance is less than the first conductance multiplied by a factor, a PUF value of the PCM device is set to logical "0". The PUF value of the PCM device is added to an overall PUF string for the array of PCM devices.

14 Claims, 5 Drawing Sheets

(56) References Cited

U.S. PATENT DOCUMENTS

| | | | |
|---|---|---|---|
| 8,971,527 | B2 | 3/2015 | Brightsky |
| 9,996,480 | B2 | 6/2018 | Walsh |
| 10,691,414 | B2 | 6/2020 | Wu |
| 2011/0163088 | A1 | 7/2011 | Besling |
| 2014/0126306 | A1 | 5/2014 | Otterstedt |
| 2014/0140502 | A1* | 5/2014 | Brightsky ............... G06F 21/60 380/28 |
| 2015/0070979 | A1* | 3/2015 | Zhu .................... G11C 11/1695 365/158 |
| 2016/0148666 | A1* | 5/2016 | Rosenberg ............... G09C 1/00 365/158 |
| 2017/0288885 | A1 | 10/2017 | Khatib Zadeh |
| 2018/0337777 | A1* | 11/2018 | Shieh ...................... G06F 21/73 |
| 2019/0221139 | A1 | 7/2019 | Schrijen |
| 2020/0169423 | A1 | 5/2020 | Cambou |
| 2020/0396092 | A1 | 12/2020 | Cambou |
| 2021/0342489 | A1* | 11/2021 | Kumar .................... G06F 21/78 |

OTHER PUBLICATIONS

L. Zhang et al., "PCKGen: A phase change memory based cryptographic key generator," in Proceedings of IEEE International Symposium on Circuits and Systems (2013), pp. 1-4.

Thomas McGrath et al., "A PUF taxonomy", Appl. Phys. Rev. 6, 011303 (2019); 26 Pgs. https:// doi: 10.1063/1.5079407>.

International Searching Authority, "The International Search Report and the Written Opinion of the International Searching Authority", International application No. PCT/CN2022/118900, International filing date Sep. 15, 2022, 8 pages.

* cited by examiner

310

Bits Allocation — 318

| A3 | A2 | A1 | A0 | M1 | M0 | S | R |

312  314  316

320

| ROM Address 322 | ROM Program 324 | Description 326 |
|---|---|---|
| 0000 | A3-0=0001, M1=0, M0=0, S=0, R=1 | Reset PCM |
| 0001 | A3-0=0010, M1=0, M0=1, S=0, R=0 | Measure G0 |
| 0010 | A3-0=0011, M1=0, M0=0, S=1, R=0 | Apply partial SET |
| 0011 | A3-0=0100, M1=0, M0=0, S=1, R=0 | Apply partial SET |
| 0100 | A3-0=0101, M1=1, M0=0, S=0, R=0 | Measure G1 |
| 0101 | A3-0=0110, M1=0, M0=0, S=0, R=0 | J=G1> f x G0 ? |
| 0110 | A3-0=1111, M1=0, M0=0, S=0, R=1 | If J=0, RESET and jump to END |
| 0111 | A3-0=1000, M1=0, M0=0, S=1, R=0 | Apply more partial SET |
| 1000 | A3-0=1111, M1=0, M0=0, S=1, R=0 | Apply yet another partial SET |
| 1111 | A3-0=1111, M1=0, M0=0, S=0, R=0 | END |

PHYSICALLY UNCLONABLE FUNCTION BASED ON A PHASE CHANGE MATERIAL ARRAY

BACKGROUND

The present invention relates generally to the field of semiconductor-based security devices, and more particularly to implementing a physically unclonable function based on a phase change material (PCM) array.

A physically unclonable function (PUF), is a physical object that for a given input and conditions provides a physically defined "digital fingerprint" output that serves as a unique identifier, most often for a semiconductor device such as a microprocessor. A PUF is a physical entity embodied in a physical structure. PUFs are most often based on unique physical variations which occur naturally during semiconductor manufacturing. Today, PUFs are usually implemented in integrated circuits and are typically used in applications with high security requirements, more specifically cryptography.

A PCM can be used to create a type of non-volatile random-access memory. In a PCM, heat produced by the passage of an electric current through a heating element, typically made of titanium nitride, is used to either quickly heat and melt-quench the material, making it amorphous, or to hold it in its crystallization temperature range for some time, thereby switching it to a crystalline state.

A typical PCM device consists of a small active volume of phase-change material sandwiched between two electrodes. In a PCM memory device, data are stored using the electrical resistance contrast between a high-conductive crystalline phase and a low-conductive amorphous phase of the phase-change material. PCM memory devices may have two terminals, the electrodes described above, or four terminals, where a separate heater element is used to change the phase of the device.

SUMMARY

Embodiments of the present invention disclose a method, a computer program product, and a system for implementing a PUF based on a PCM array. In one embodiment, for each PCM device in an array of PCM devices, the PCM device is reset to an initial state. A first conductance of the PCM device is measured. A predetermined number of partial set pulses is applied to the PCM device. A second conductance of the PCM device is measured. Responsive to determining that the second conductance is greater than the first conductance multiplied by a factor, a PUF value of the PCM device is set to logical "1". Responsive to determining that the second conductance is less than the first conductance multiplied by a factor, a PUF value of the PCM device is set to logical "0". The PUF value of the PCM device is added to an overall PUF string for the array of PCM devices.

DETAILED DESCRIPTION

Figure 1:
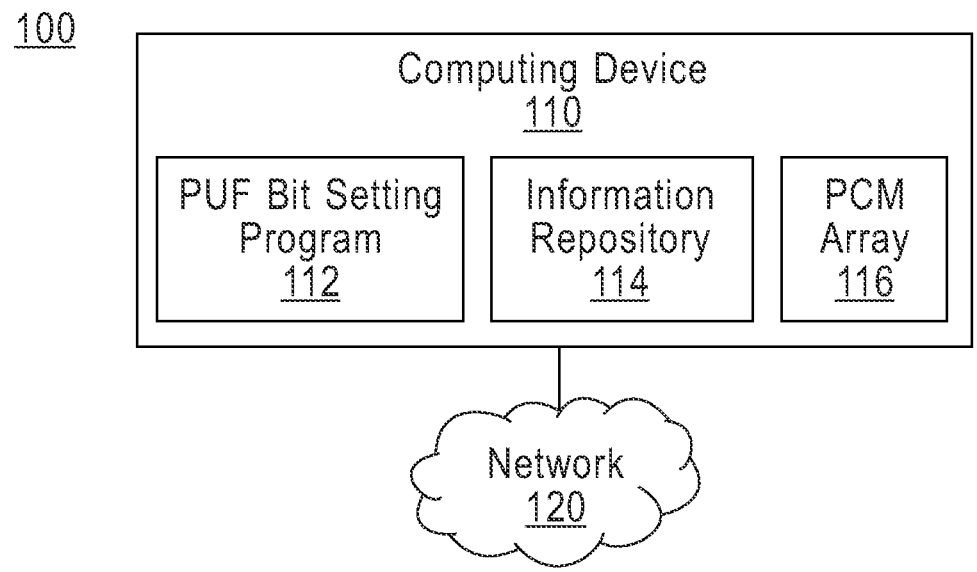
FIG. 1 is a functional block diagram illustrating a distributed data processing environment, in accordance with an embodiment of the present invention.

Authentication is essential in cryptography to confirm the identity of parties during communications. In practice, the more complex the identities are the more secure the authentication process. The PUF is one such complex authentication method, in which identities are embodied in structures, rather than stored in memory elements. A PUF provides a "digital fingerprint," where information is usually read from the random variations in devices based on manufacturing tolerances, rather than having an identity programmed in, like cryptographic keys, preventing a malicious party from making a copy for nefarious use later on. Many concepts for the physical source of the uniqueness of these PUFs have been developed for multiple different applications.

A PUF is a hardware security fundamental that translates an input challenge into an output response through a physical system in a manner that is specific to the exact hardware instance and cannot be replicated, hence unclonable. This allows the system to be uniquely authenticated. One of the principles behind a PUF is that the cryptographic key(s) are not stored in binary form when the chip is powered down but are hidden in the form of unique physical analog identifiers within the hardware so that the code can only be retrieved from an uncompromised PUF device. Thus, when a circuit is turned on, the structures comprising the PUF can be measured, and the analog values converted into a binary code (or key) using an on chip measurement circuit. However, if the chip is turned off, the binary code is not stored in any memory, but is implicit in the properties of the chip.

The present invention is a computer-implemented method, computer program product, and system for implementing a PUF based on a PCM array, where each PCM device implements a single bit PUF device where all the PUF devices are configured in an array. In an embodiment of the present invention, a PCM device consists of a layer of PCM between a pair of two electrodes, which can be heated and then cooled. In some embodiments, the PCM device also consists of a separate heater element that is positioned near the PCM but separated by an electrical insulator. In an embodiment, this insulator is highly conductive to heat although a poor electrical conductor. Depending on the rate of cooling, the PCM can turn into an amorphous phase (with heating to reach a melt followed by fast cooling) or a crystalline phase (with heating to above the solid-state crystallization temperature or heating to melt followed by gradual cooling). In most PCM of interest the amorphous phase has a higher resistance than the crystalline phase. A controlled heating process can ensure a 50/50 chance of being in either form, determined by unpredictable and uncontrollable variations between each PCM cell at the time of manufacture and of resetting. This can be applied to every cell in an array of PCM, and the response of a single PCM element in an array prepared in this manner can be found and compared with a reference. The phase of each cell of this memory can translate to give a 0 or 1-bit response, forming a unique and resettable output from the array in total.

In embodiments of the present invention, after the PCM device is fully RESET to the amorphous state, partial SET current pulses are applied to the electrodes of a two terminal PCM device, or to the heater element of a four terminal PCM device, to change the PCM device from the fully amorphous state to a state with a crystalline region. An illustration of a PCM device following a full RESET with an amorphous region in the PCM can be seen in FIG. 4B.

Figure 2:
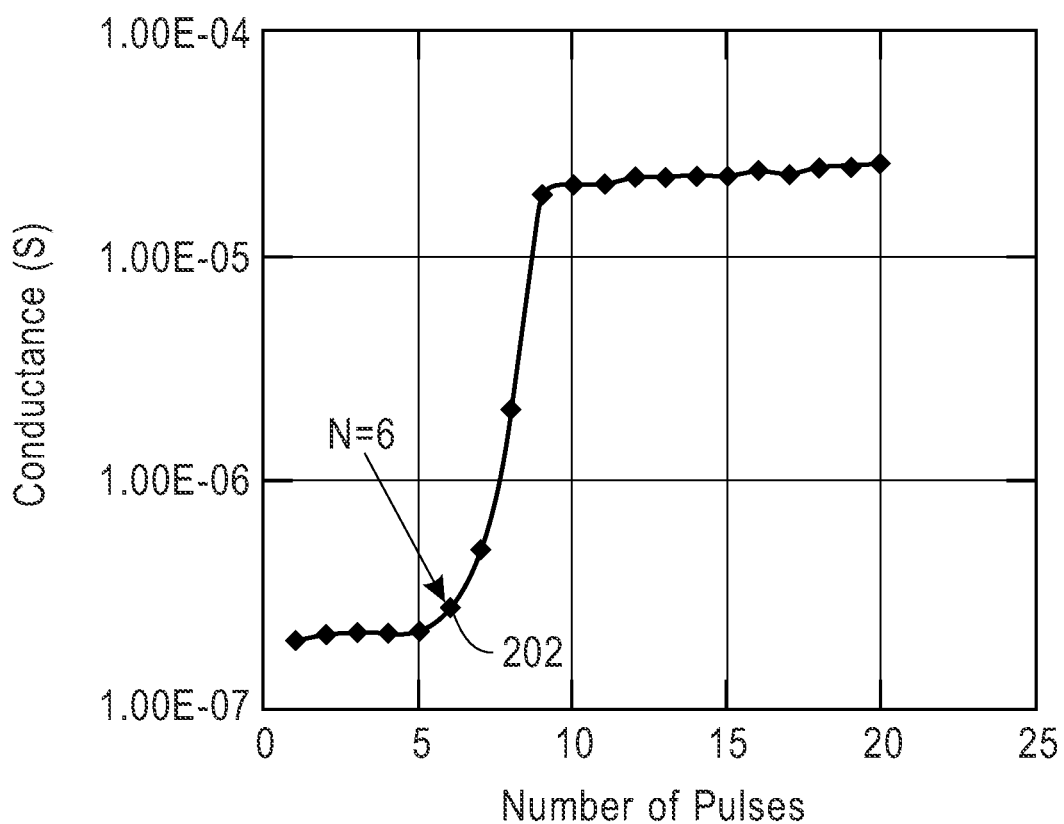
FIG. 2 is an example graph of the conductance of a PCM device versus the number of partial set pulses administered to the device since the last RESET of the device, in accordance with an embodiment of the present invention.

It takes several partial SET current pulses before the conductance (or resistance) sharply changes (see FIG. 2 for an example of the phase change curve). In an embodiment, however, the number of pulses to reach the threshold varies from device to device. The variation in the number of current pulses necessary to reach the threshold is a result of device dimensions variations and also the stochastic nature of the PCM crystallization process.

The present invention determines the threshold where the device conductance starts changing rapidly. By varying the partial set pulses duration or amplitude it is possible to change the number of pulses required to reach the threshold. In an embodiment, the present invention determines a value, N, for the number and duration of partial set pulses where the conductance starts to change rapidly for a typical PCM device. Once these values are predetermined, the invention will apply this number and duration of partial set pulses to each PCM device in the PCM array. For each PCM device, the conductance is measured after the N partial set pulses are applied, and that conductance is compared to the initial conductance that was previously measured after a RESET operation was performed on the PCM device. Based on the comparison of the conductance measured after the N partial set pulses to the initial conductance, a value of "0" or "1" is assigned to the PCM device. The value assigned to the PCM device is added to an overall PUF string that contains the values for every PCM device in the PCM array. Once this procedure has been applied to all PCM devices in the PCM array, a binary string results that is unique to the specific PCM array based on the manufacturing tolerances discussed above.

FIG. 1 is a functional block diagram illustrating a distributed data processing environment, generally designated 100, suitable for operation of PUF bit setting program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a monolithic integrated circuit (IC) chip, a system on a chip (SOC), a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes PUF bit setting program 112. In an embodiment, PUF bit setting program 112 is a program, application, or subprogram of a larger program for implementing a PUF based on a PCM array.

In an embodiment, computing device 110 includes information repository 114. In an embodiment, information repository 114 may be managed by PUF bit setting program 112. In an alternate embodiment, information repository 114 may be managed by the operating system of the device, alone, or together with, PUF bit setting program 112. Information repository 114 is a data repository that can store, gather, compare, and/or combine information. Information repository 114 includes, but is not limited to, PCM data, conductance data, PCM array data, statistical data, PCM reset data, and other data that is received by PUF bit setting program 112 from one or more sources, and data that is created by PUF bit setting program 112.

In an embodiment, computing device 110 includes PCM array 116. In another embodiment, computing device 110 may be an encryption/decryption processor that contains the PCM array. In a preferred embodiment the PUF function implemented in the PCM array is monolithically integrated as part of the CPU chip and/or additional chips that needs a PUF function. In an embodiment, PCM array 116 may contain any number of PCM devices. In an embodiment, PCM array 116 may be composed of two terminal PCM devices. In another embodiment, PCM array 116 may be composed of four terminal PCM devices. In yet another embodiment, PCM array 116 may be composed other programable material devices, for example, resistive random-access memory devices.

FIG. 2 is an example graph of the conductance of a PCM device versus the number of partial set pulses applied to the device since the last full RESET of the device, in accordance with an embodiment of the present invention.

In the example graph of FIG. 2, the conductance a the PCM device is plotted as a function of the partial set pulses numbered (1-20). The conductance is close to $10^{-7}$ Siemens (S) following a full RESET and reaches $10^{-4}$ S when the device is fully SET. In this example, the sixth pulse, Pulse 202, is the threshold where the device conductance starts changing rapidly. By varying the partial set pulses duration or amplitude it is possible to change the number of pulses required to reach the threshold.

Figure 3:
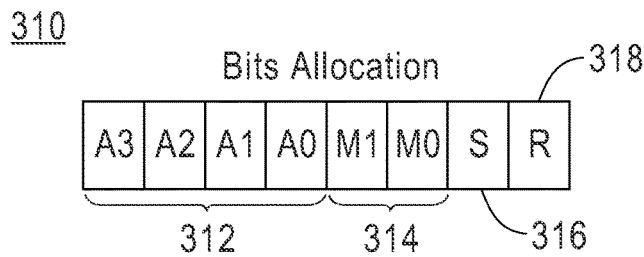
FIG. 3 illustrates an example of a state machine implemented in a Read Only Memory (ROM) device to implement a PUF function, in accordance with an embodiment of the present invention.

FIG. 3 illustrates an example of a state machine implemented in a Read Only Memory (ROM) device to implement a PUF function, in accordance with an embodiment of the present invention. FIG. 3 includes an example 320 of all ROM address 322 combinations, their ROM program 324 bits allocation and a description 326 for each ROM address.

In the example of FIG. 3, Bits Allocation 310 includes Reset Bit 318, which indicates if a RESET pulse is applied in that step. When R=1 a pulse generator circuit will deliver a RESET pulse to the PCM device. When R=0 the output of the RESET pulse generator is disabled. The next bit, Set Bit 316 indicates if a partial SET pulse is applied to the PCM device. If S=1 the output of the circuit that generates a partial SET enabled, and if S=0 the output of the partial SET is disabled.

The next bits are Measure Bits 314, which are numbered M0 and M1. In an embodiment, measure bits 314 will activate a measurement circuit that obtains the conductance of the PCM device. In an embodiment, that circuit may charge a capacitor to a voltage that is proportional to the PCM conductance. In this example, if M0=1 the circuit is activated and if M0=0 the circuit is disabled, but the capacitor will maintain the previous measurement voltage. In an embodiment, M1 will activate a measurement circuit, which may be the same measurement circuit as discussed earlier, but the resulting voltage will be stored on a second capacitor.

Address Bits 312 are used to store the address of the next step in the algorithm. These bits will sequence the program in the ROM. These bits labeled as A3-A0. In operation the conductance is measured upon RESET and again after applying N partial set pulses to the PCM device, and the two results are compared. The output of the comparator, J, together with address bits 312 are used to generate the next address for the ROM.

Figure 4A:
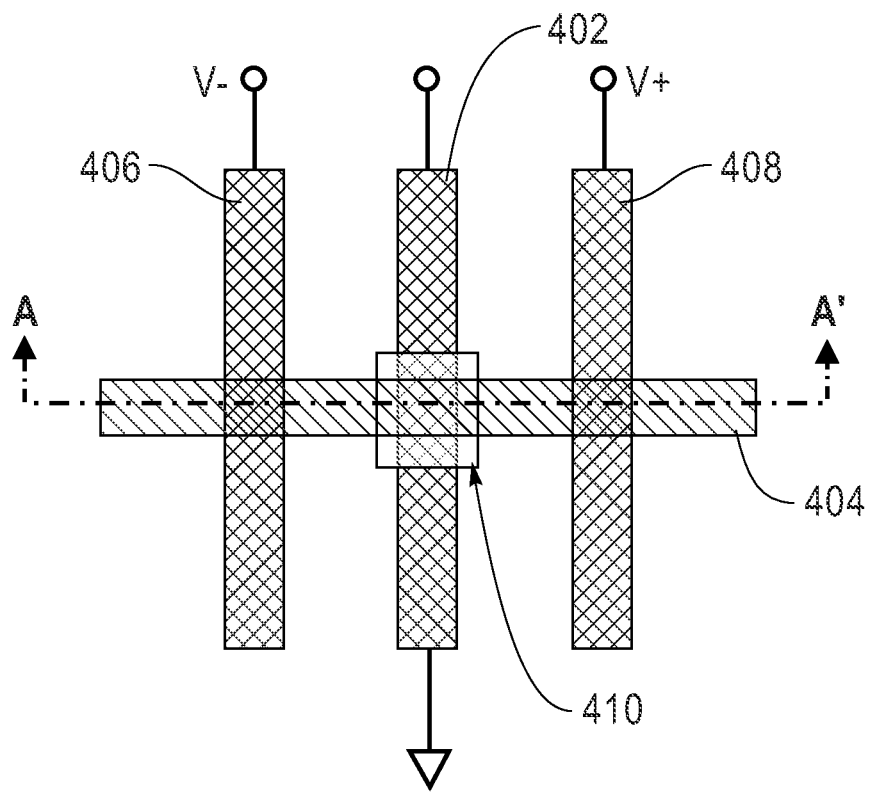
FIG. 4A represents a top view of a four terminal PCM device, in accordance with an embodiment of the present invention.
Figure 4B:
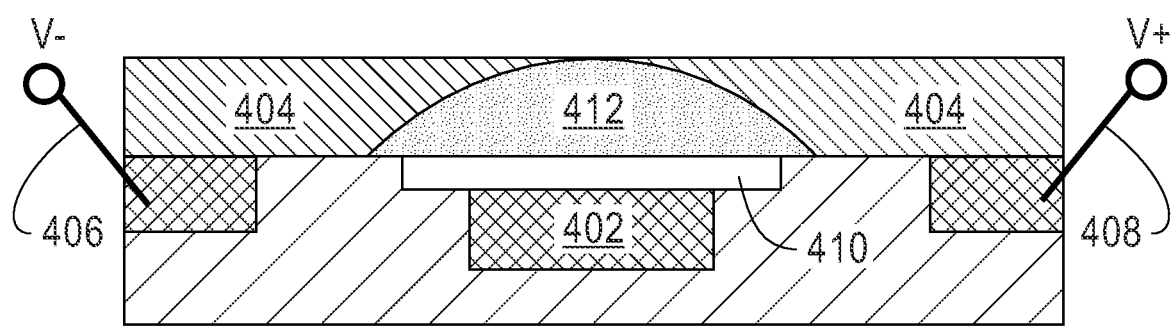
FIG. 4B represents a cross section view through slice A-A' of a four terminal PCM device, in accordance with an embodiment of the present invention.

FIG. 4A represents a top view of a four terminal PCM device, in accordance with an embodiment of the present invention. FIG. 4B represents a cross section view through slice A-A' of a four terminal PCM device, in accordance with an embodiment of the present invention.

The four-terminal device in FIGS. 4A & 4B includes a negative terminal, V− 406, and a positive terminal, V+ 408. The device conductance is measured between terminals 406 and 408. In an embodiment, V− 406 and V+ 408 may be formed using tungsten. In addition, the four-terminal device includes Heater 402. In an embodiment, heater 402 may be Tantalum Nitride (TaN) or doped Carbon.

The example of FIG. 4A and FIG. 4B includes c-PCM 404, which is the PCM in the crystalline state. The PCM may include common materials such as Ge2Sb2Te5, GeTe and Sb2Te3. FIG. 4A also includes Insulator 410. In an embodiment, insulator 410 is a good thermal conductor but a poor electrical conductor, to separate heater 402 from c-PCM 404. In an embodiment, insulator 410 may be Boron Nitride (BN) or Aluminum Nitride (AlN).

In the cross-sectional view of FIG. 4B, an additional structure, a-PCM 412, can be seen. The structure a-PCM 412 is a high resistance structure created by heater 402 during a RESET pulse operation where the PCM is in the amorphous state. In a two-terminal device embodiment, the amorphous region a-PCM 412 may form a type of structure typically referred to as a dome or mushroom PCM device due to the shape of the amorphous dome. In a four-terminal device embodiment, the amorphous region 412 may resemble half a cylinder located above heater 402.

Figure 5:
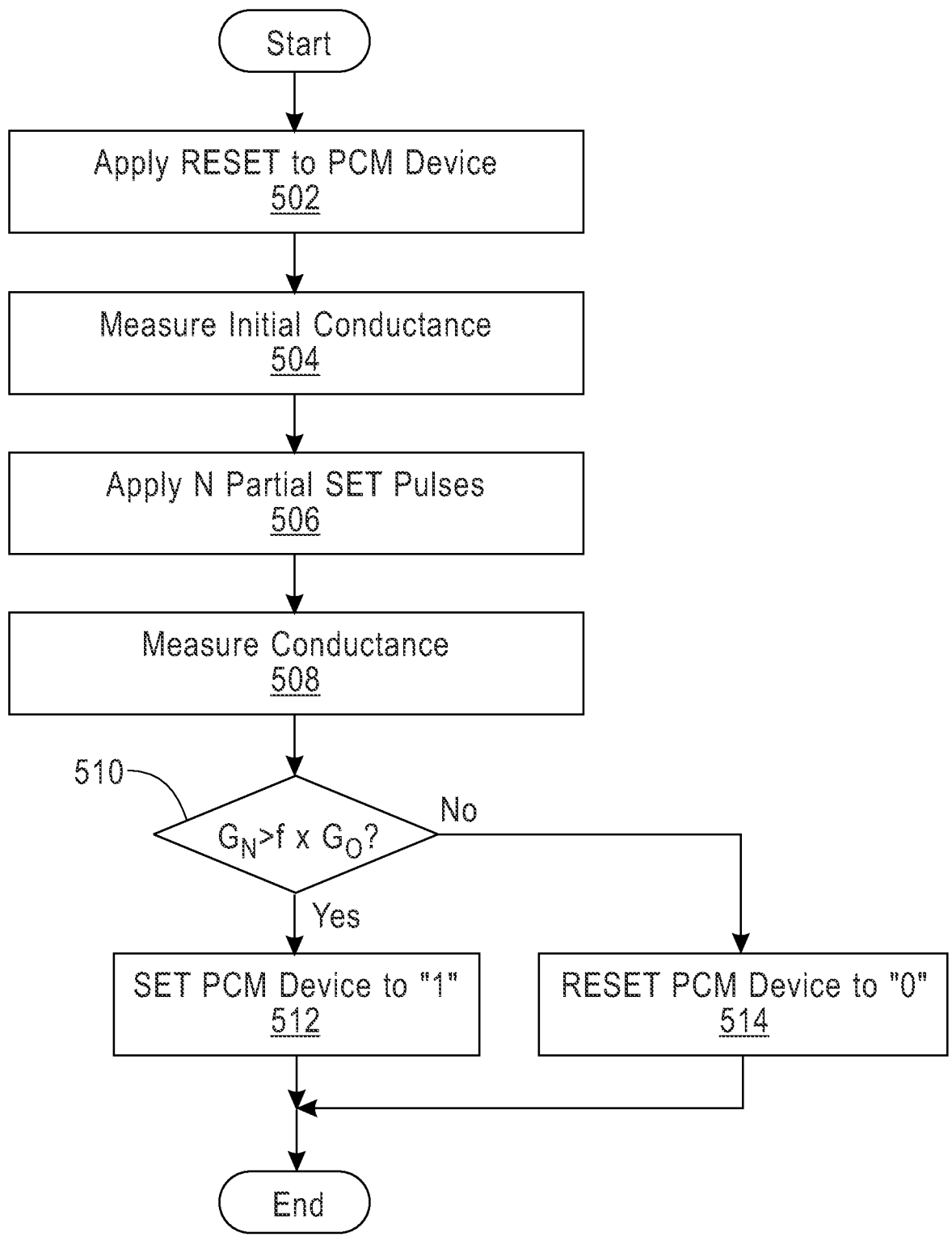
FIG. 5 represents the steps performed by PUF bit setting program 112 for implementing a PUF function in a PCM device, in accordance with an embodiment of the present invention.

FIG. 5 represents the steps performed by PUF bit setting program 112 for implementing a PUF function in a PCM device, in accordance with an embodiment of the present invention. In an alternative embodiment, the steps of workflow 500 may be performed by any other program while working with PUF bit setting program 112. It should be appreciated that embodiments of the present invention provide at least for a implementing a PUF based on a PCM array. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, the PCM device is a two terminal PCM device that consists of two electrodes separated by the phase change material. In the two terminal PCM device embodiment, the conductance is changed by applying a current pulse directly to the device terminals.

In another embodiment, the PCM device is a four terminal PCM device that consists of two electrodes separated by the phase change material. These electrodes are used to read the device conductance. Unlike the two terminal PCM device, in the four terminal PCM device embodiment the conductance is changed by energizing a proximity heater. In an embodiment, the PCM device is SET by applying a SET pulse to the heater, which crystallizes the PCM material between the read electrodes. To RESET the device a RESET pulse is applied to the proximity heater, which leads to the formation of an amorphous PCM material in the path between the read electrodes. An example of a four terminal PCM device is illustrated in FIG. 4A and FIG. 4B above.

It should be appreciated that the process depicted in FIG. 5 illustrates one possible iteration of the steps performed by PUF bit setting program 112, which repeats for each PCM device in the PCM array.

In an embodiment, PUF bit setting program 112 applies a RESET to the PCM device to initialize the conductance of the device to a minimum conductance $G_0$. In an embodiment, PUF bit setting program 112 measures the initial conductance of the device, $G_0$, to be used as the baseline for determining the threshold where the device conductance starts changing rapidly. In an embodiment, PUF bit setting program 112 pulses each PCM devices with N partial set pulses. In an embodiment, PUF bit setting program 112 measures the conductance of the PCM device following the N pulses. In an embodiment, PUF bit setting program 112 determines if the conductance $G_N$ measured in step 508 is greater than the initial conductance, $G_0$, multiplied by a predetermined factor, f. In an embodiment, if PUF bit setting program 112 has determined that the conductance $G_N$ is greater than the initial conductance, $G_0$, multiplied by a predetermined factor, then PUF bit setting program 112 sets the device to a value of logical "1". This can be accomplished by applying a full SET pulse to the device. In an embodiment, PUF bit setting program 112 then ends for this cycle. In an embodiment, if PUF bit setting program 112 has determined that the conductance $G_N$ is less than the initial conductance, $G_0$, multiplied by a predetermined factor, then PUF bit setting program 112 resets the device to a value of logical "0". This can be accomplished by applying a full RESET pulse to the device. In an embodiment, PUF bit setting program 112 then ends for this cycle.

PUF bit setting program 112 applies RESET to a PCM device (step 502). In an embodiment, PUF bit setting program 112 applies a RESET to the PCM device to initialize the conductance of the device to a minimum conductance $G_0$.

PUF bit setting program 112 measures the initial conductance (step 504). In an embodiment, PUF bit setting program 112 measures the initial conductance of the device, $G_0$, to be used as the baseline for determining the threshold where the device conductance starts changing rapidly.

PUF bit setting program 112 applies N partial SET pulses (step 506). In an embodiment, PUF bit setting program 112 pulses each PCM devices with N partial set pulses. In the example graph of FIG. 2 above N=6. In an embodiment, N is the average number of partial set pulses to reach the threshold where the device conductance start changing rapidly. In an embodiment, N can be changed by varying the partial set pulses (amplitude or duration). In an embodiment, N may be any number of partial set pulses as would be known to a person of skill in the art.

In an embodiment, the PCM device is a two-terminal device. In this embodiment, the partial set pulses are applied to the two terminals. In another embodiment, the PCM device is a four-terminal device. In this embodiment, the partial set pulses are applied to the proximity heater element, e.g., heater 402 from FIGS. 4A and 4B, while the conductance is still measured between the two terminals, e.g., V− 406 and V+ 408 from FIGS. 4A and 4B.

PUF bit setting program 112 measures the conductance (step 508). In an embodiment, PUF bit setting program 112 measures the conductance of the PCM device following the N partial SET pulses. This value is $G_N$. In an embodiment, the conductance is measured between the two terminals on either the two-terminal device or the four-terminal device, e.g., V− 406 and V+ 408 from FIGS. 4A and 4B.

PUF bit setting program 112 determines if $G_N > f \times G_0$ (decision block 510). In an embodiment, PUF bit setting program 112 determines if the conductance $G_N$ measured in step 508 is greater than the initial conductance, $G_0$, multiplied by a predetermined factor, f. In an embodiment, the predetermined factor f depends on the amplitude and duration of the partial set pulses. In an embodiment, the predetermined factor f is chosen to create a clear contrast in the conductance values to make it easy to determine the point where the conductance starts changing rapidly. For example, the value of f can be determined by plotting a distribution of the conductance values and choosing a one sigma value of the distribution.

In an embodiment, if PUF bit setting program 112 determines that the conductance $G_N$ is less than the initial conductance, $G_0$, multiplied by a predetermined factor ("no" branch, decision block 510), then PUF bit setting program 112 proceeds to step 514. In an embodiment, if PUF bit setting program 112 determines that the conductance $G_N$ is greater than the initial conductance, $G_0$, multiplied by a predetermined factor ("yes" branch, decision block 510), then PUF bit setting program 112 proceeds to step 512.

PUF bit setting program 112 SETs the PCM Device to logical "1" (step 512). In an embodiment, if PUF bit setting program 112 has determined that the conductance $G_N$ is greater than the initial conductance, $G_0$, multiplied by a predetermined factor, then PUF bit setting program 112 sets the device to a value of logical "1". In an embodiment, PUF bit setting program 112 then ends for this cycle.

PUF bit setting program 112 RESETs the PCM Device to logical "0" (step 514). In an embodiment, if PUF bit setting program 112 has determined that the conductance $G_N$ is less than the initial conductance, $G_0$, multiplied by a predetermined factor, then PUF bit setting program 112 resets the device to a value of logical "0". In an embodiment, PUF bit setting program 112 then ends for this cycle.

Figure 6:
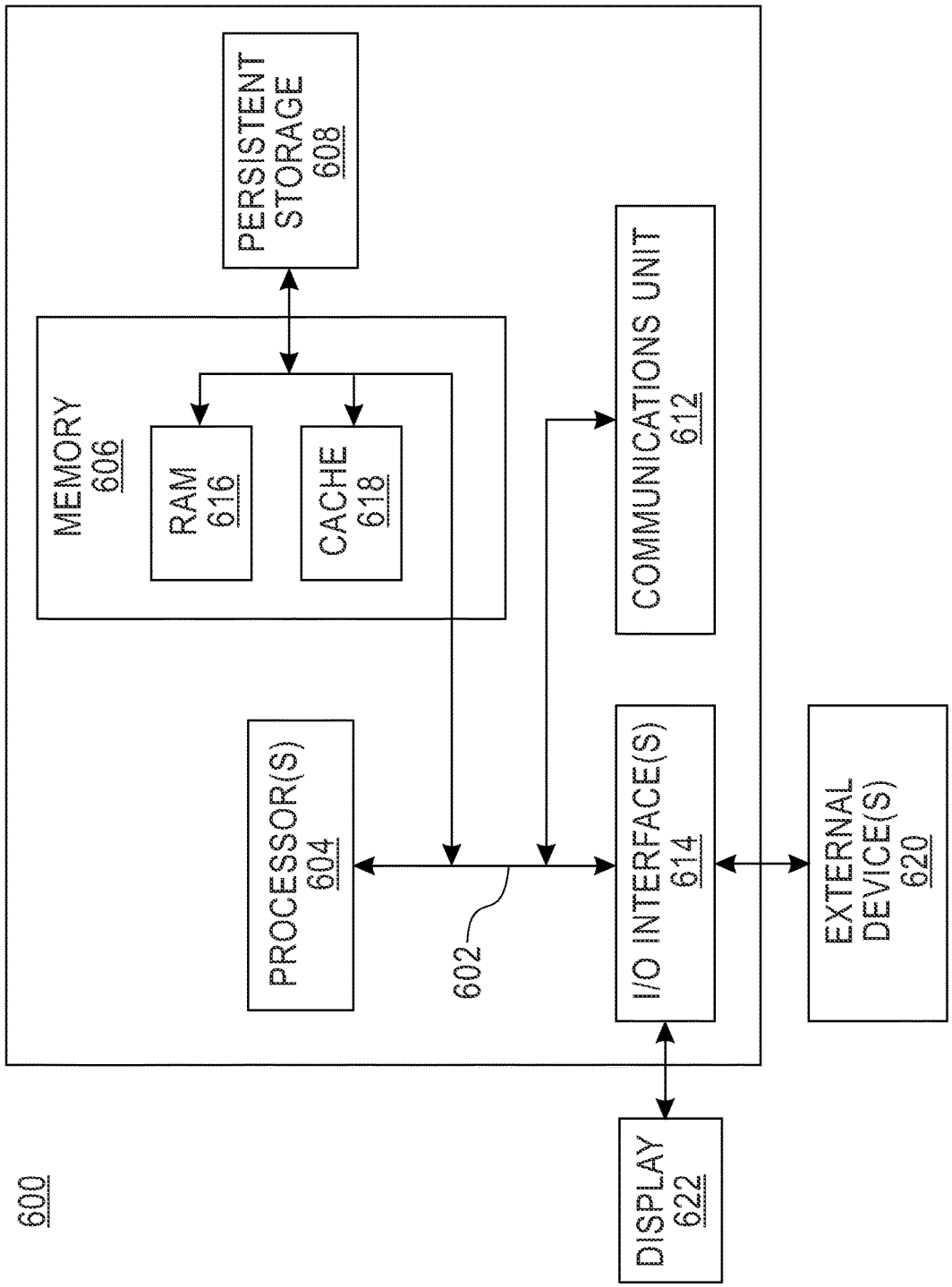
FIG. 6 depicts a block diagram of components of the computing device executing the PUF bit setting program within the distributed data processing environment of FIG. 1, in accordance with an embodiment of the present invention.

FIG. 6 is a block diagram depicting components of computing device 110 suitable for PUF bit setting program 112, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for PUF bit setting program 112 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., PUF bit setting program 112, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    for each phase change material (PCM) device in an array of PCM devices:
        resetting, by one or more computer processors, the PCM device to an initial state;
        measuring, by one or more computer processors, a first conductance of the PCM device;
        applying, by one or more computer processors, a predetermined number of partial set pulses to the PCM device;
        measuring, by one or more computer processors, a second conductance of the PCM device;
        determining, by one or more computer processors, whether the second conductance is greater than the first conductance multiplied by a factor, the factor determined from an amplitude and duration of the partial set pulses;
        responsive to determining whether the second conductance is greater than the first conductance multiplied by the factor, setting, by the one or more computer processors, a physically unclonable function (PUF) value of the PCM device; and
        adding, by the one or more computer processors, the PUF value of the PCM device to an overall PUF string for the array of PCM devices.

2. The computer-implemented method of claim 1, wherein the factor is further determined by plotting a distribution of a plurality conductance values for the array of PCM devices and choosing a one sigma value of the distribution of the plurality conductance values.

3. The computer-implemented method of claim 1, wherein applying the predetermined number of partial set pulses to the PCM device comprises:
    applying, by one or more computer processors, the predetermined number of partial set pulses to a pair of electrodes, wherein the PCM device is a two-terminal device.

4. The computer-implemented method of claim 1, wherein applying the predetermined number of partial set pulses to the PCM device comprises:
    applying, by one or more computer processors, the predetermined number of partial set pulses to a heater element, wherein the PCM device is a four-terminal device.

5. The computer-implemented method of claim 1, wherein the initial state is an amorphous phase.

6. A computer program product comprising:
    one or more computer readable storage media and program instructions collectively stored on the one or more computer readable storage media, the program instructions including instructions to:
        for each phase change material (PCM) device in an array of PCM devices:
            reset the PCM device to an initial state;
            measure a first conductance of the PCM device;
            apply a predetermined number of partial set pulses to the PCM device;
            measure a second conductance of the PCM device;
            determine whether the second conductance is greater than the first conductance multiplied by a factor, the factor determined form an amplitude and duration of the partial set pulses;
            responsive to determining whether the second conductance is greater than the first conductance multiplied by the factor, set a physically unclonable function (PUF) value of the PCM device; and
            add the PUF value of the PCM device to an overall PUF string for the array of PCM devices.

7. The computer program product of claim 6, wherein the factor is further determined by plotting a distribution of a plurality conductance values for the array of PCM devices and choosing a one sigma value of the distribution of the plurality conductance values.

8. The computer program product of claim 6, wherein the program instructions to apply the predetermined number of partial set pulses to the PCM device comprise one or more program instructions, collectively stored on the one or more computer readable storage media, to:
    apply the predetermined number of partial set pulses to a pair of electrodes, wherein the PCM device is a two-terminal device.

9. The computer program product of claim 6, wherein the program instructions to apply the predetermined number of partial set pulses to the PCM device comprise one or more program instructions, collectively stored on the one or more computer readable storage media, to:
    apply the predetermined number of partial set pulses to a heater element, wherein the PCM device is a four-terminal device.

10. The computer program product of claim 6, wherein the initial state is an amorphous phase.

11. A computer system comprising:
    one or more computer processors;
    one or more computer readable storage media; and
    program instructions collectively stored on the one or more computer readable storage media for execution by at least one of the one or more computer processors, the stored program instructions including instructions to:

for each phase change material (PCM) device in an array of PCM devices:
  reset the PCM device to an initial state;
  measure a first conductance of the PCM device;
  apply a predetermined number of partial set pulses to the PCM device;
  measure a second conductance of the PCM device;
  determine whether the second conductance is greater than the first conductance multiplied by a factor, the factor determined form an amplitude and duration of the partial set pulses;
  responsive to determining whether the second conductance is greater than the first conductance multiplied by the factor, set a physically unclonable function (PUF) value of the PCM device; and
  add the PUF value of the PCM device to an overall PUF string for the array of PCM devices.

12. The computer system of claim 11, wherein the factor is further determined by plotting a distribution of a plurality of conductance values for the array of PCM devices and choosing a one sigma value of the distribution of the plurality conductance values.

13. The computer system of claim 11, wherein the program instructions to apply the predetermined number of partial set pulses to the PCM device comprise one or more program instructions, collectively stored on the one or more computer readable storage media for execution by at least one of the one or more computer processors, to:
  apply the predetermined number of partial set pulses to a pair of electrodes, wherein the PCM device is a two-terminal device.

14. The computer system of claim 11, wherein the program instructions to apply the predetermined number of partial set pulses to the PCM device comprise one or more program instructions, collectively stored on the one or more computer readable storage media for execution by at least one of the one or more computer processors, to:
  apply the predetermined number of partial set pulses to a heater element, wherein the PCM device is a four-terminal device.

* * * * *